United States Patent [19]

Rydquist et al.

[11] Patent Number: 4,463,565
[45] Date of Patent: Aug. 7, 1984

[54] TURBOCHARGED INTERNAL COMBUSTION ENGINE WITH BOOST PRESSURE AND IGNITION TIMING CONTROL FOR PREVENTING KNOCKING COMBUSTION

[75] Inventors: Jan E. Rydquist, Billdal; Lars Sandberg, Gothenburg; Ralf Wallin, Lindome, all of Sweden

[73] Assignee: AB Volvo, Gothenburg, Sweden

[21] Appl. No.: 348,723

[22] Filed: Feb. 16, 1982

[30] Foreign Application Priority Data

Feb. 19, 1981 [SE] Sweden .................. 8101119

[51] Int. Cl.³ ............................................. F02B 37/12
[52] U.S. Cl. ...................................... 60/602; 123/425
[58] Field of Search ............. 60/600, 601, 602, 603, 60/611; 123/425, 564

[56] References Cited

U.S. PATENT DOCUMENTS 2,670,724  3/1954  Reggio ........................ 123/425 X
4,322,948  4/1982  Emmenthal et al. ............ 60/602
4,372,119  2/1983  Gillbrand et al. ............... 60/600

FOREIGN PATENT DOCUMENTS 78054    5/1983  European Pat. Off. ........... 123/425
3106579  9/1982  Fed. Rep. of Germany ...... 123/425

OTHER PUBLICATIONS

SAE Paper No. 780413, Buick's Turbocharged V-6 Powertrain for 1978, Wallace, Feb. 1978.

Primary Examiner—Michael Koczo
Attorney, Agent, or Firm—Young & Thompson

[57] ABSTRACT

A system for preventing knocking combustion in a turbocharged Otto engine includes a knock detector mounted on the engine block and coupled to a microprocessor which controls the engine charge pressure and ignition timing. Upon indication of a certain knocking intensity, the processor sends signals to a valve regulating the charge pressure to reduce this pressure as well as signals to the engine timing control system to retard the engine ignition timing.

6 Claims, 6 Drawing Figures

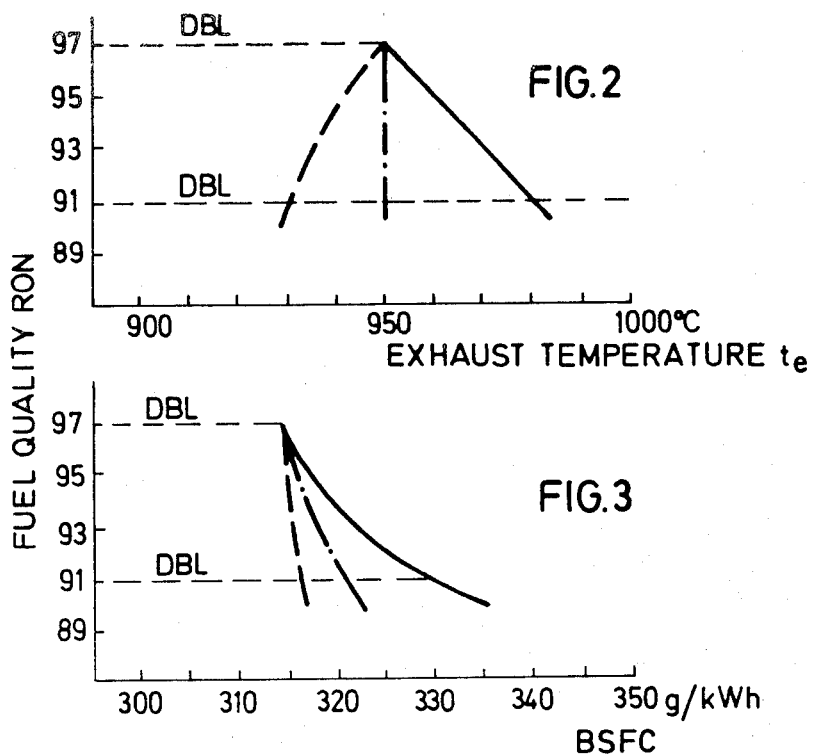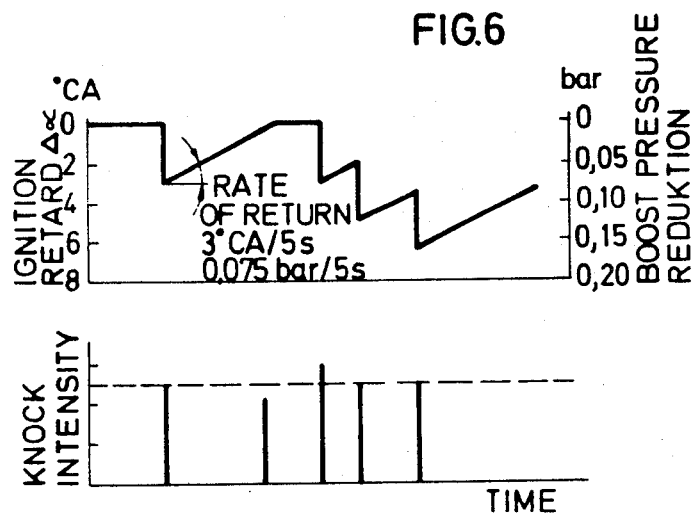

TURBOCHARGED INTERNAL COMBUSTION ENGINE WITH BOOST PRESSURE AND IGNITION TIMING CONTROL FOR PREVENTING KNOCKING COMBUSTION

The present invention relates firstly to a process for preventing knocking combustion in a turbocharged Otto engine, in which process a knock detector is used to detect knocking, signals sent by the detector indicating knocking of a certain intensity being used to reduce the engine charge pressure, and secondly a system for carrying out the process, which comprises a knock detector mounted on the engine and signal processing means which are arranged to receive signals sent from the detector and to send control signals dependent thereon to means controlling the charge pressure, the signal processing means being arranged to, upon receiving signals indicating knocking, send signals to the means controlling the charge pressure to reduce the charge pressure.

A control system is previously known which detects knocking combustion and automatically lowers the charge pressure to a level at which the knocking ceases. Such a system increases the tolerance of the engine to different fuel qualities and has the advantage over a system using ignition retard, of avoiding increased exhaust temperature due to ignition retard, thus eliminating the risk of overheating. A system which reduces the charge pressure to avoid knocking is, however, not without disadvantages. The system is slower than a system using ignition timing regulation and the performance losses are significantly greater. Furthermore, engine fuel economy is poorer when driven with so-called high octane fuel and at partial load.

The purpose of the present invention is to achieve a process for preventing knocking combustion which results in the least possible performance loss in combination with maintaining good fuel economy when driven with high octane fuel, and at the same time avoiding risk of overheating.

This is achieved according to the invention in a process of the type described by way of introduction by using the signals indicating knocking to retard ignition timing in combination with the reduction of the charge pressure.

By selecting the exhaust temperature as the constant parameter and balancing the ignition retard against the pressure reduction, so as to keep the exhaust temperature at an essentially constant level when changing between different fuel qualities, a substantial reduction in performance losses is achieved in comparison with pressure reduction alone, as well as eliminating the risk of thermo-overloading of the components on the exhaust side of the engine. By virtue of the fact that the ignition can be regulated to follow the detonation boundary line over the entire pressure range, a lower specific fuel consumption is achieved than with pressure regulation alone.

A system of the type described in the introduction for carrying out the process, is characterized in that the signal processing means, preferably comprising a microprocessor, are disposed to send signals to the means controlling engine ignition timing to retard engine ignition timing in combination with the reduction of the charge pressure.

The invention will be described in more detail with reference to an embodiment shown in the accompanying drawings.

FIGS. 2 and 3 show diagrams of exhaust temperature and specific fuel consumption respectively for different fuel qualities and different control strategies.

FIG. 6 is a diagram showing the charge pressure reduction and the ignition retard as a function of time at different knocking intensities in the control process according to the invention.

Figure 1:
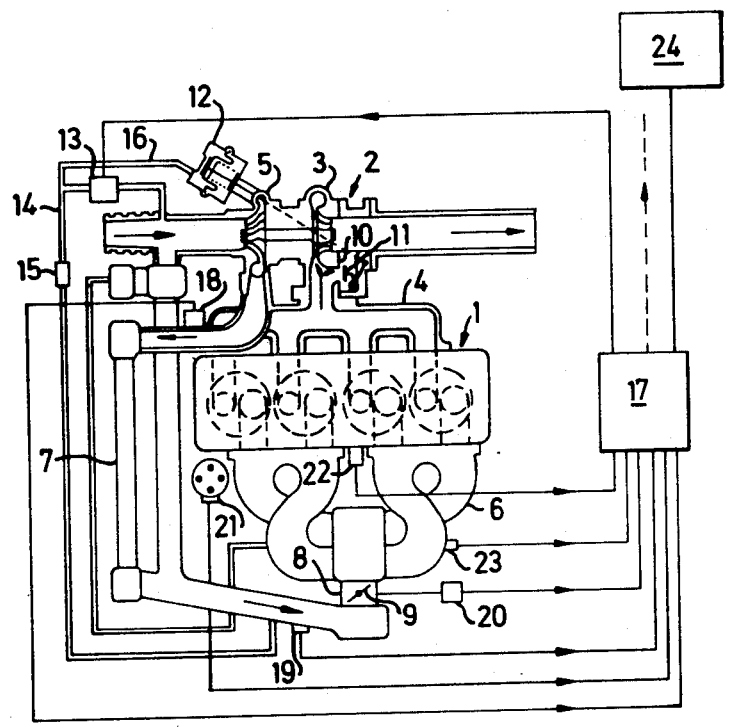
FIG. 1 shows schematically a turbocharged combustion engine with a system for preventing knocking combustion.

The engine 1 shown in FIG. 1 is a four-cylinder Otto engine with a turbocompressor unit 2 (known per se), comprising a turbine portion 3 communicating with the engine exhaust manifold 4 and a compressor portion 5 communicating with the engine intake manifold 6 via a charge air cooler 7 of air-air type and a throttle body 8 containing the engine throttle 9. The gasflow through the turbine 3 is regulated in a known manner with the aid of a waste gate 11 coupled into a shunt pipe 10, which gate can be actuated by a pneumatic operating mechanism 12 and which when closed directs the entire gasflow through the turbine. The pressure in the operating mechanism 12 and thus the setting of the waste gate is determined by an electromagnetic frequency valve 13 in a line 14 which, via a calibrated constriction 15, connects the suction and pressure sides of the compressor to each other and from which a line 16 branches to the operating mechanism 12. During operation, the frequency valve switches periodically between the open and closed positions and by varying the period length, the pressure in the line 16 can be varied thus varying the pressure in the operating mechanism 12 as well.

The frequency valve 13 is controlled by a signal processing unit in the form of a microprocessor 17, to which signals are fed representing engine rpm, throttle position, charging air pressure and charging air temperature, and in which a command value of the charge pressure as a function of engine speed is stored. The input signals to the microprocessor are obtained from various sensors 18, 19, 20 and 21. The sensor 18 placed in the pipe between the compressor 5 and the intercooler 7 can be a piezoresistive transductor, which registers the charge pressure. The sensor 19 can be a fast NTC-resistor, which registers the charge air temperature and the sensor 20 can be a potentiometer 20 coupled to the throttle 9, to register the throttle position. Signals representing engine speed can be obtained from a Hall-effect sensor 21 already present in the distributor.

On the basis of the input signals from the sensors 19, 20, 21, the processor 17 determines the command value of the charging pressure at each operational state. The signal from the charging pressure sensor 18 provides information on any deviation between the command value and the actual value of the charge pressure. Signals indicating actual charge pressure which is too low result in the processor 17 increasing the opening time of the valve 13, which in turn results in a pressure drop in the line 16 to the operating mechanism 12, which then moves the waste gate 11 towards the closed position.

The flow through the shunt pipe 10 drops and the turbine speed increases thereby increasing the charge pressure. The reverse procedure occurs if the actual charge pressure is too high.

By this closed looping of the charge pressure, it is possible to keep the charge pressure continuously at a predetermined value. The principle provides great flexibility in determining the charge pressure characteristic and makes the system independent of mechanical tolerances such as, for example variations in the characteristic of the return spring means in the operating mechanism 12.

The microprocessor control makes it possible, at full load, to place the level of the maximum charge pressure slightly below the boundary for knocking, to obtain optimum performance for a given fuel quality. The result is, however, that the margins to harmful knock will be quite small. In order to compensate for increased engine sensitivity to variations in fuel quality, the system described above includes a knock detector 22 mounted on the engine block, which can be a piezoelectric accelerometer which is connected to the processor 17 and provides it with continuous information on knock intensity, the processor being programmed, upon register in a predetermined knock intensity, to trigger corrective measures by, according to the invention, on the one hand sending signals to the valve 13 to effect reduction of the actual charge pressure below the command value pressure and, on the other hand, sending signals to the engine timing system 24 to effect retardation of the engine ignition timing.

The diagram in FIG. 2 illustrates how pressure reduction and ignition retard, represented by the dashed and the solid lines respectively, each affect the exhaust temperature in tests performed on a 2.1 liter four-cylinder engine with a maximum power of 114 kW DIN. The tests were performed at maximum load at the detonation boundary line (DBL) at 3000 rpm and with 97, 94 and 91 RON fuel. As can be seen in the diagram, a sharp increase in the exhaust temperature was obtained with only ignition retard when changing to a fuel of lower quality, while pressure reduction alone resulted in a drop in the temperature but instead a sharp deterioration of engine performance as revealed in the table below. The diagram in FIG. 3 illustrates the effect of ignition retard (solid line) and pressure reduction (dashed line) on the specific fuel consumption of the engine.

In the process according to the invention, the exhaust temperature was selected as the controlling parameter in programming the processor 17, the pressure reduction and the ignition retard being balanced against each other to keep the exhaust temperature constant, as illustrated by the dash-dot curve in FIG. 2. The resulting changes in the specific fuel consumption are illustrated by the dash-dot curve in FIG. 3.

In this test engine, the optimum combination of pressure reduction and ignition retard was found to be circa 0.03 bar per degree crank angle ignition retard.

The following table shows the effect of the various strategies on engine performance, fuel economy and exhaust temperature.

| Strategy | Change in spec. fuel cons. % | Change in torque % | Change in exhaust temp. °C. | Ignition retard degrees crankangle | Charge pressure reduction bar |
|---|---|---|---|---|---|
| I Ignition retard only | +5.1 | −5.7 | +30 | −5 | 0 |
| II Pressure reduction only | +0.8 | −9.1 | −19 | 0 | −0.13 |
| III Combined ignition retard and pressure reduction | +2.4 | −6.3 | 0 | −3 | 0.075 |

As can be seen from the Table, strategy I results in a sharply increased exhaust temperature with unacceptably high thermoload on the components on the exhaust side, while strategy II leads to performance losses which are more than 43% greater than according to strategy III.

Figure 4:
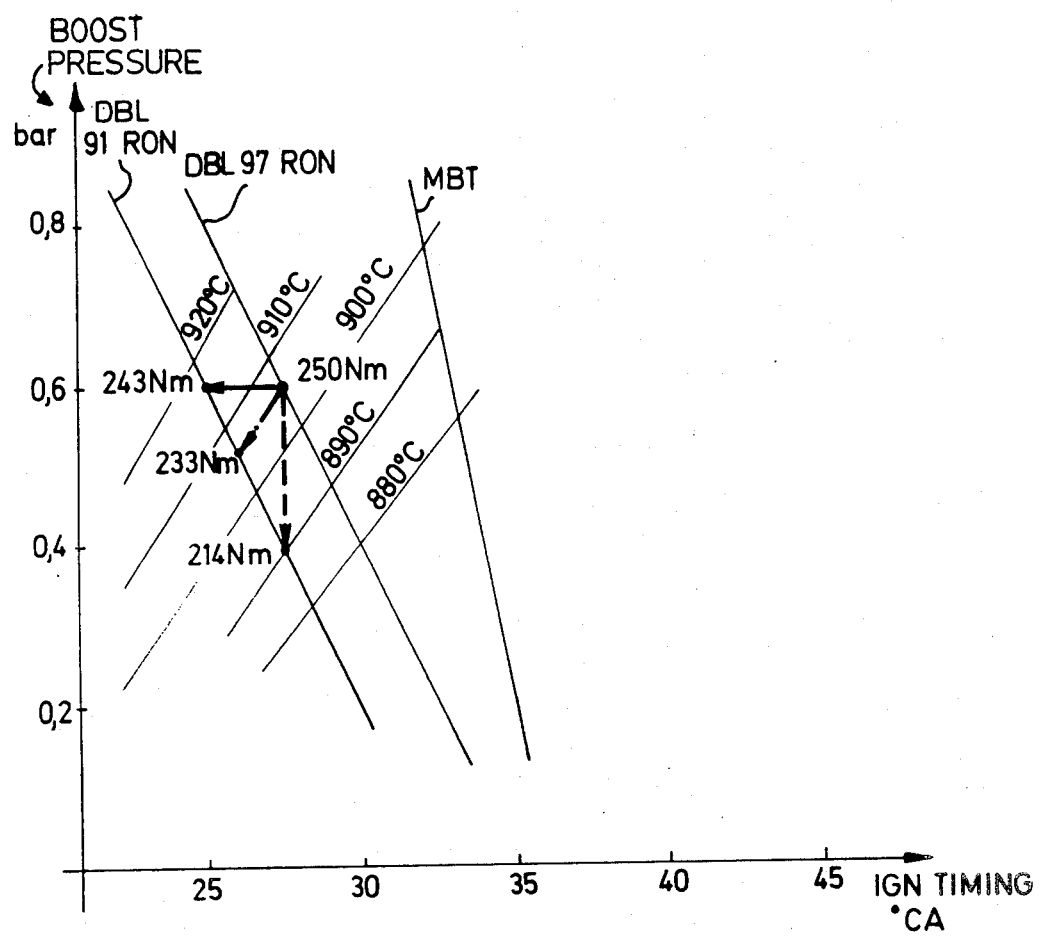
FIG. 4 is a diagram illustrating torque reduction when changing fuel quality according to different control strategies.

The diagram in FIG. 4 shows the absolute values of the torque and exhaust temperature in the same engine test and, with 97 and 91 RON fuel, but in this case at 2700 rpm. The solid, dashed and dash-dot arrows represent the strategy I, II and III respectively, and show the respective changes in torque. As the diagram reveals, pressure reduction alone results in a reduction of torque from 250 Nm to 214 Nm, while combined pressure reduction and ignition retard results in a torque reduction merely from 250 Nm to 233 Nm, while maintaining the exhaust temperature at circa 905° C. Ignition retard alone results in a rise in the exhaust temperature by circa 10° C.

Figure 5:
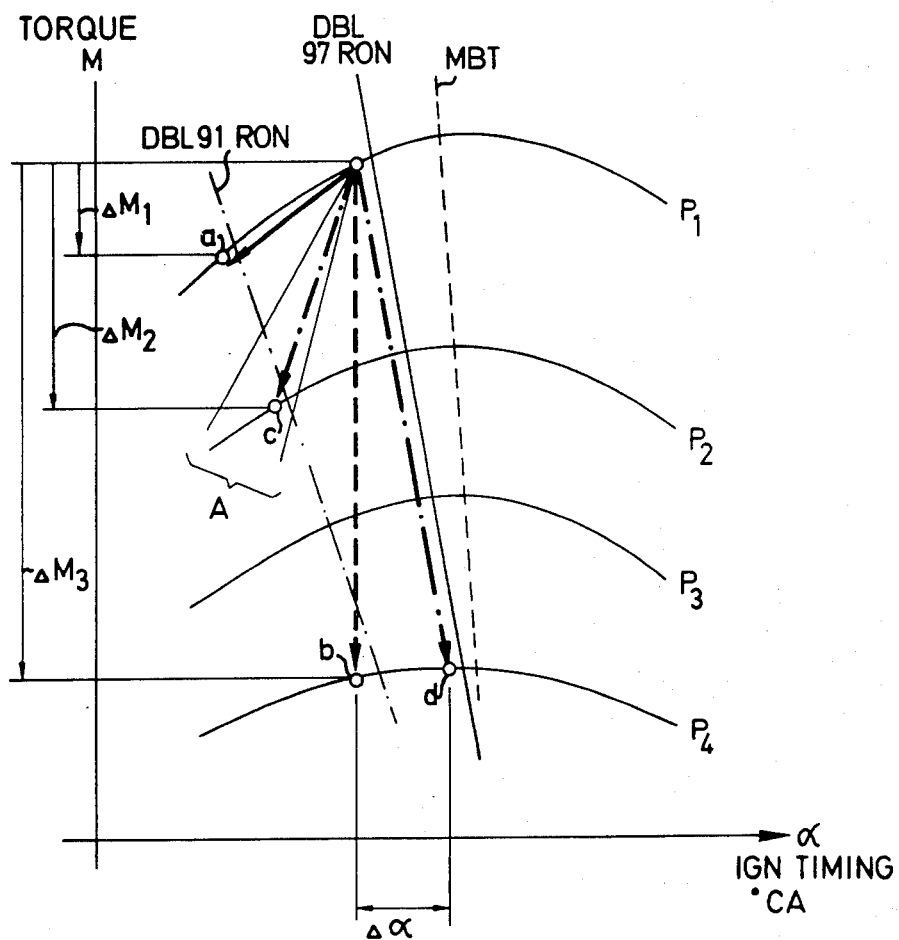
FIG. 5 is a diagram showing the ignition timing, for different control strategies, in relation to the timing for optimum fuel economy.

As mentioned in the introduction, an engine with a knock control system using charge pressure reduction alone, will have poorer fuel economy than an engine provided with the system according to the invention when driven with a fuel with low tendency to knock, e.g. 97 RON fuel. This is because the ignition system of the first mentioned system must be set so that ignition—at the lowest pressure which the system can shift down to—takes place beneath the knock boundary for the specified fuel which has the greatest tendency to knock, e.g. 91 RON fuel. THis is illustrated by the diagram in FIG. 5, where $P_1$–$P_4$ designate various constant pressure levels and MBT indicates the ignition timing for best fuel economy, which as can be seen from the diagram (and which applies to most engines) lies higher than the knock boundary even for 97 RON fuel at these loads. To the left of the line DBL 91 RON there are the three ignition points a, b and c for the three control strategies discussed for driving with 91 RON fuel and at full load. $\Delta M_1$, $\Delta M_2$ and $\Delta M_3$ designate the reductions in torque when changing from 97 to 91 RON fuel. At partial load (pressure level $P_4$) and 97 RON fuel, with the control strategy according to the invention, the ignition can be adjusted to point d, while the ignition when only pressure change is used must remain at point b even when using 97 RON fuel. The difference of $\Delta \alpha$ in ignition timing results in a fuel consumption at partial load which is 4–5% higher than according to the last-mentioned control strategy. A designates the interval for constant exhaust temperature in the control strategy according to the invention.

In the example described, the microprocessor 17 was programmed to reduce the charge pressure and retard the ignition in a number of rapid absolute steps of 0.075 bar and 3 degrees crank angle. The system was set to go into effect upon detecting knocking combustion during five or more of twenty successively registered cycles and to return the charge pressure and the ignition timing to the original values at a rate of 0.075 bar and 3 degrees crank angle per 5 seconds after knocking has ceased. FIG. 6 illustrates this change of charge pressure and ignition timing as a function of time at various knocking intensities.

Thus the invention achieves an effective method of reducing performance losses in a high performance engine when changing to a fuel of lower quality. By virtue of the fact that the exhaust temperature is not affected, high sustained power loads are permissible without shortening the life of the engine. The control system shown in FIG. 1 also includes a safety device in the form of a pressure switch 23 mounted on the intake manifold. This switch shuts off fuel supply to the engine if a fault should occur so that the charge pressure exceeds a permissible level.

What we claim is:

1. In a system for preventing knocking combustion in a turbocharged Otto engine, said system including means controlling the charge pressure and means controlling engine ignition timing, comprising a knock detector mounted on the engine block and signal processing means disposed to receive signals sent from the detector and to send control signals dependent thereon to said means controlling the charge pressure, said signal processing means being arranged upon receiving signals indicating knocking of a certain intensity to send signals to said means controlling the charge pressure to reduce the charge pressure; the improvement in which the signal processing means are disposed to send signals to said means controlling engine ignition timing to retard engine ignition timing in combination with the reduction of the charge pressure.

2. System according to claim 1, characterized in that the signal processing means are disposed to balance the ignition timing retardation against the pressure reduction so that the engine exhaust temperature is kept essentially constant regardless of fuel quality within a predetermined quality interval.

3. System according to claim 1, characterized in that the signal processing means comprise a microprocessor which is programmed upon registration of a predetermined knock intensity, to reduce the pressure and retard the ignition timing, in rapid absolute steps, and when the knocking has subsided to increase the pressure and advance the ignition timing to the original values at a slower rate.

4. System according to claim 3, characterized in that the microprocessor is programmed to reduce the pressure about 0.03 bar per degree crank angle ignition retard.

5. System according to claim 1, characterized in that the knock detector is coupled to the signal processing means in which a command value of the charge pressure as a function of the engine speed is stored, and that the signal processing means are disposed, upon receiving a signal indicating knocking of a certain intensity, to send a signal to the means controlling the charge pressure to lower the actual charge pressure to a level below the command value pressure.

6. System according to claim 1, characterized in that said means controlling the charge pressure is a valve.

* * * * *